UNITED STATES PATENT OFFICE.

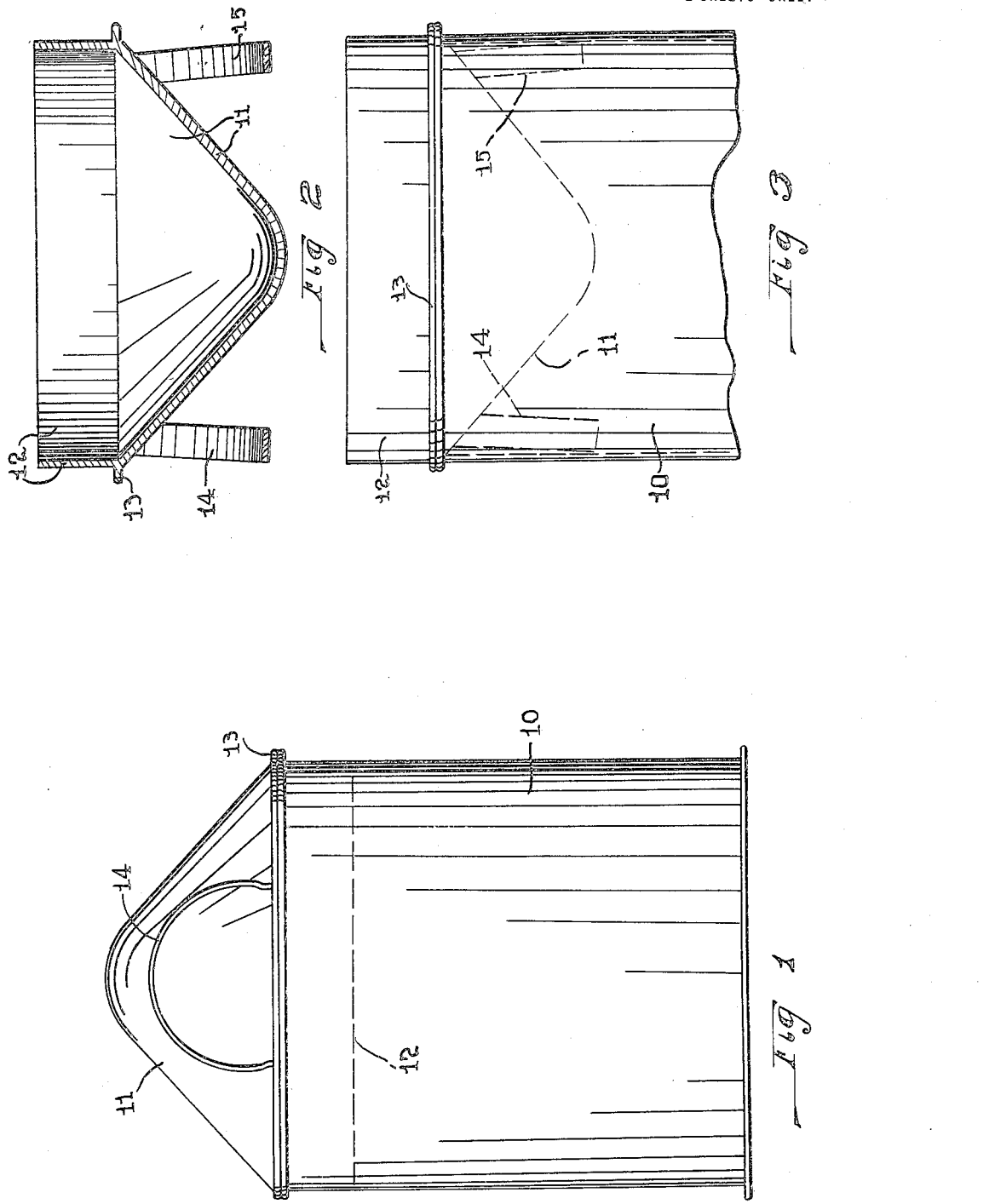

HERMAN L. ALEXANDER, OF CHICAGO, ILLINOIS.

COOKING UTENSIL.

1,384,035.  Specification of Letters Patent.  Patented July 12, 1921.

Application filed December 18, 1920. Serial No. 431,643.

*To all whom it may concern:*

Be it known that I, HERMAN L. ALEXANDER, a citizen of the United States, and a resident of the city of Chicago, county of Cook, and State of Illinois, have invented certain new and useful Improvements in Cooking Utensils, of which the following is a specification.

My invention relates to cooking utensils of the type disclosed in my application Serial No. 370,438 filed April 1, 1920, of which the present application is a continuation in part. It is the principal object of my invention to provide a new and improved form and arrangement of parts whereby the lid or cover is adapted to be used in an inverted position as an auxiliary container for mixing or any other desired purpose and whereby means is provided for supporting the cover from tipping either when in position on the body of the utensil or when in position on a flat table.

Other objects will appear hereinafter.

The invention consists in the combinations and arrangements of parts hereinafter described and claimed.

Figure 4:
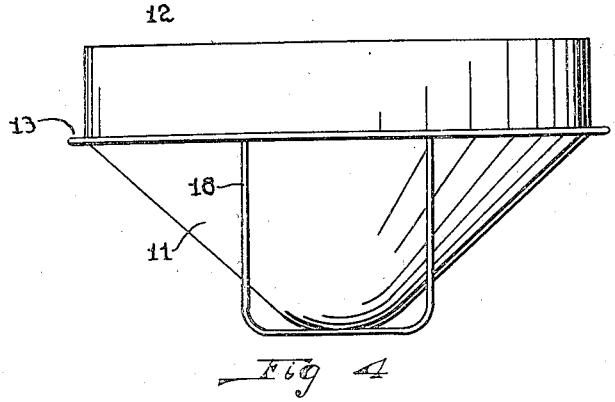
Figure 5:
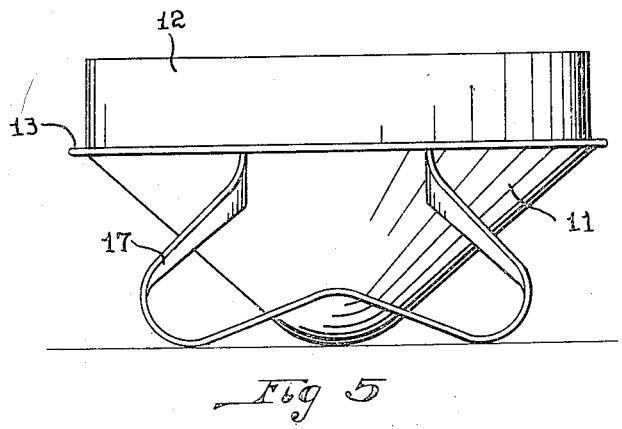
Figure 6:
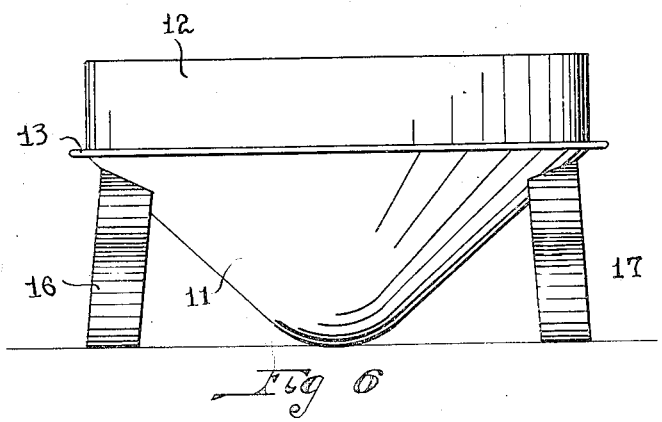

The invention will be best understood by reference to the accompanying drawings forming a part of this specification, and in which, Figure 1 is a side view of one form of my improved utensil, Fig. 2 is a central vertical section through the lid or cover of Fig. 1 shown in inverted position, Fig. 3 is a side view of the parts shown in Fig. 1 but with the lid supported in inverted position on the can, Fig. 4 is a side view of a slightly modified form of cover in inverted position, Fig. 5 is a view similar to Fig. 4 but showing still another modified form, and Fig. 6 is a view of the cover of Fig. 5 as seen from the right in said figure.

Referring to Figs. 1, 2 and 3, 10 indicates a vessel or receptacle of any suitable type for use for cooking purposes, being open at its upper end. Removably mounted upon the receptacle 10 as shown in Fig. 1, there is a cover comprising a deep, conical or dome-shaped upper portion 11 and a cylindrical portion 12, the cylindrical portion 12 being inserted within the upper end of the receptacle 10. An outwardly extending rib or flange 13 is provided about the outer edge of the dome-shaped portion 11, the flange or rib 13 being adapted to support the cover in position upon the receptacle either in its normal upright position as shown in Fig. 1 or in inverted position as shown in Fig. 3. As will be readily understood, when the cover is supported in inverted position on the upper end of the receptacle 10, it is capable of use as an auxiliary container, either for the purpose of mixing or for any other desired purpose.

At opposite sides of the peak or upper end of the dome-shaped portion of the cover, I have provided upright handles 14 and 15 by which the cover can be conveniently held for opening and closing the receptacle. The shape and disposition of the handles 14 and 15 are such as to cause them to have snug engagement with the inner face of the wall of the receptacle when the cover is applied to the receptacle in inverted position as is shown in Fig. 3, for holding the cover firmly in position upon the receptacle.

In the form of cover shown in Figs. 5 and 6, handles 16 and 17 are employed in lieu of the handles 14 and 15, said handles being of such a size and shape as to terminate in the vertical plane passing along the upper end of the dome-like portion 11, whereby the lid is adapted to be supported by the handles in inverted position upon a plane surface such as the flat top of a table, the handles being adapted to support the cover against tipping sidewise. As is shown in Fig. 5, each of the handles 16 and 17 is also so shaped as to provide a plurality of bearings upon a table, such bearings being in spaced relation to each other. The cover is thus held firmly in position against tipping in any direction.

The construction shown in Fig. 4 is similar to that of Fig. 5, except that a handle 18 is provided in lieu of the handle 17, the upper end of the handle 18 being flat or straight for providing a plurality of bearing points.

As will be readily understood, the handles 16 and 17 of the construction shown in Figs. 5 and 6, and the handles 18 at opposite sides of the dome-like portion 11 of the cover as shown in Fig. 4 are preferably so shaped and so disposed as to be capable of being slipped into snug engagement with the upper end portion of the receptacle as is shown in connection with the cover of Fig. 3, but I do not wish to be restricted to this form of construction except as hereinafter specifically claimed.

By making the bow-shaped handles of such a length as to cause them to terminate at their upper ends in the horizontal plane passing through the upper end of the dome-like portion 11 of the cover, the cover is given a three-base support in inverted position upon a table, the handles being adapted to give steadiness to the cover, while the bearing of the peak of the dome upon the table relieves the handles of the greater portion of the stress incident to the use of the cover as a mixing bowl, thus reducing to a minimum the danger of the handles becoming loosened or broken off in use. Again, when the cover is arranged as shown in Fig. 3, it serves as a closure for the receptacle and at the same time serves as an auxiliary receptacle or mixing bowl.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In a device of the class described, the combination of a receptacle open at its upper end; and a cover comprising a deep dome-shaped portion, and laterally extending means about the outer edge of the dome-shaped portion for supporting the cover upon the receptacle, said cover being adapted to serve as a mixing bowl.

2. In a device of the class described, the combination of a receptacle open at its upper end; and a cover comprising a deep, dome-shaped upper portion, and a laterally extending rib about the outer edge of the dome-shaped portion adapted to support the cover upon the receptacle in either the normal upright position or in inverted position to serve as an auxiliary bowl.

3. In a device of the class described, the combination of a receptacle open at its upper end; and a cover comprising a conical, dome-shaped portion, a cylindrical portion forming an extension of the dome-shaped portion and adapted to fit within the upper end of the receptacle, a laterally extending rib formed between the dome-shaped portion and the cylindrical portion serving to support the cover upon the receptacle, and means to support said cover inverted on the table.

4. In a device of the class described, the combination of a receptacle open at its upper end; a cover comprising a dome-shaped portion, and means for supporting the cover upon the receptacle; and uprights carried by said cover on the outer face of the dome-shaped portion adapted by snug engagement with the inner face of the receptacle to hold the cover in inverted position thereon.

5. In a device of the class described, the combination of a receptacle open at its upper end; a cover comprising a dome-shaped portion, and means for supporting the cover upon the receptacle; and bow-shaped handles carried by said cover at opposite sides of the dome arranged to move into snug engagement with the inner face of the receptacle for holding the cover in inverted position thereon.

6. In a device of the class described, the combination of a receptacle open at its upper end; a bowl-like cover for said receptacle; and handles in spaced relation above said cover, terminating at their upper ends in a horizontal plane passing along the upper end portion of the cover, adapted to hold the cover from tipping when resting in inverted position on a plane surface.

7. In a device of the class described, the combination of a receptacle open at its upper end; a bowl-like cover for said receptacle; and handles in spaced relation at opposite sides of said cover, the upper end portions of said handles being shaped to provide at each side of the cover a plurality of bearings in a plane extending transversely of the cover for supporting the cover in inverted position on a plane surface.

8. In a device of the class described, the combination of a receptacle open at its upper end; a bowl-like cover for said receptacle; and handles at opposite sides of the cover extending at their upper ends to and terminating in the horizontal plane passing along the upper end portion of the cover, the upper end portions of each of the handles being shaped to effect contact between the handle and a plane surface at a plurality of points in spaced relation circumferentially of the cover when the cover is resting in inverted position on such plane surface.

9. In a device of the class described; the combination of a receptacle open at its upper end; a bowl-like cover for said receptacle; and bow-shaped handles for the cover at opposite sides thereof, the upper end portion of each of said handles being flattened, serving as a rest for the cover, whereby it may be firmly supported upon a plane surface in an inverted position.

10. An open-ended vessel, and a cover therefor of hollow dome-shape, the cover being formed with bow-shaped handles secured to it on opposite sides of the peak of the dome and the highest points of the handles being in the plane of the dome of the cover, whereby the latter when inverted is adapted to serve as a bowl-like vessel having three supports, consisting of said handles and the peak of the dome situated between them.

11. An open-ended vessel, and a cover therefor of hollow dome-shape, the cover being formed with a pair of bow-shaped handles secured to it on opposite sides of the peak of the dome, the upper end portions of the handles being flat and being located in the same plane with the upper end of the dome of the cover, whereby the cover is adapted to rest in inverted position on a plane surface with three supports comprising the handles and the peak of the dome between the handles.

In testimony whereof I have signed my name to this specification in the presence of two subscribing witnesses.

HERMAN L. ALEXANDER.

Witnesses:
 JOSHUA R. H. POTTS,
 FREDA C. APPLETON.